United States Patent [19]
Kingsley

[11] Patent Number: 5,451,349
[45] Date of Patent: Sep. 19, 1995

[54] ADVANCED GAS CONTROL IN GAS-LIQUID MIXING SYSTEMS

[75] Inventor: Jeffrey P. Kingsley, Newburgh, N.Y.

[73] Assignee: Praxair Technology, Inc., Danbury, Conn.

[21] Appl. No.: 286,980

[22] Filed: Aug. 8, 1994

[51] Int. Cl.⁶ .............................................. B01F 3/04
[52] U.S. Cl. ....................................... 261/91; 261/93; 261/123
[58] Field of Search ............................ 261/91, 93, 123

[56] References Cited

U.S. PATENT DOCUMENTS

| | | | |
|---|---|---|---|
| 3,933,640 | 1/1976 | Kirk et al. | 261/91 |
| 4,017,565 | 4/1977 | Muller | 261/123 |
| 4,192,740 | 3/1980 | Savard et al. | 261/93 |
| 4,263,143 | 4/1981 | Ebner et al. | 261/87 |
| 4,454,077 | 6/1984 | Litz | 261/91 |
| 4,549,997 | 10/1985 | Verner et al. | 261/123 |
| 4,900,480 | 2/1990 | Litz et al. | 261/36.1 |
| 5,004,571 | 4/1991 | Litz et al. | 261/91 |

*Primary Examiner*—Tim R. Miles
*Attorney, Agent, or Firm*—Alvin H. Fritschler

[57] ABSTRACT

Sloped inner and outer conical baffles are provided in a gas-liquid mixing system having a recirculating portion of a body of liquid, separated from a quiescent portion of the body of liquid and an overhead gas phase, precluding the collection of gas under the baffles, eliminating dead zones of gas, and minimizing the passage of gas to the overhead gas phase during normal operation, while facilitating the venting of gases during upset conditions.

15 Claims, 1 Drawing Sheet

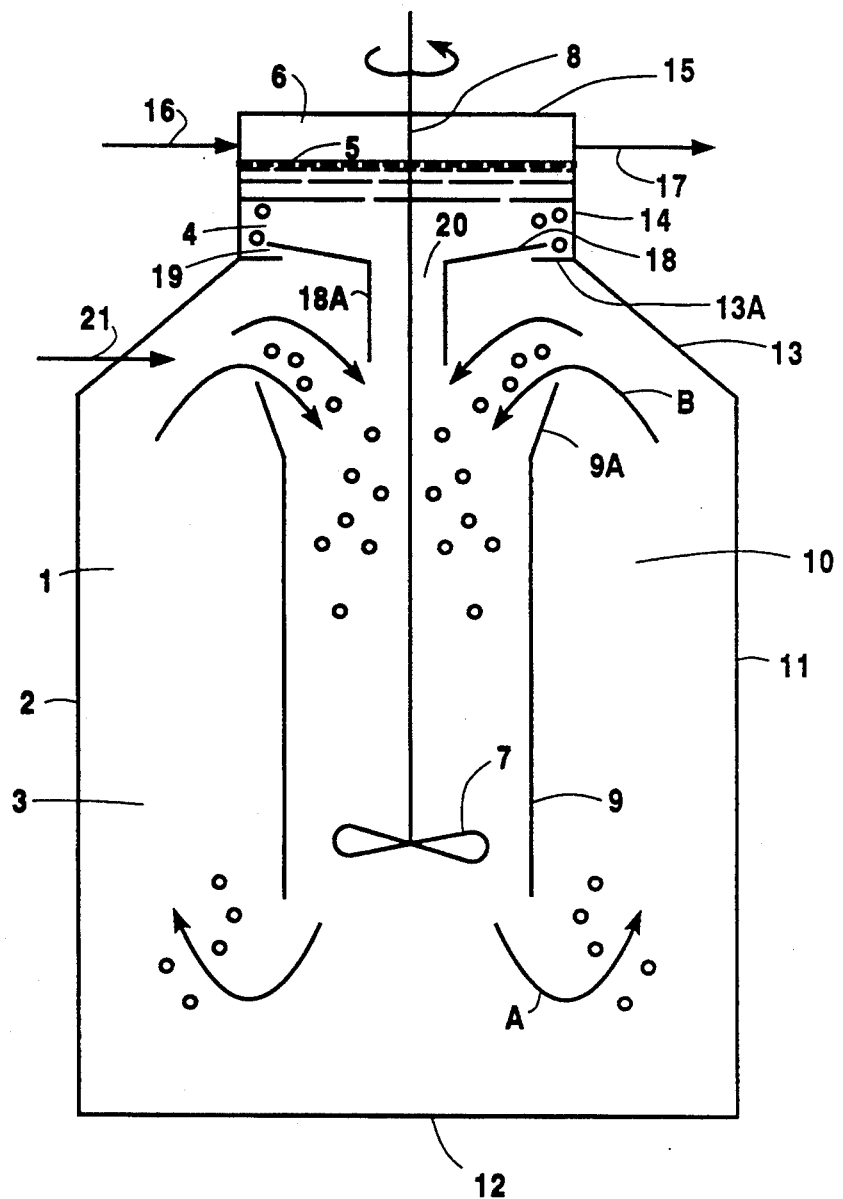

ADVANCED GAS CONTROL IN GAS-LIQUID MIXING SYSTEMS

FIELD OF THE INVENTION

This invention relates to the mixing of gases and liquids. More particularly, it relates to the containment and disengagement or gases during gas-liquid mixing operations.

DESCRIPTION OF THE PRIOR ART

A wide variety of processes and systems are known in the art for mixing of gases and liquids. Thus, stirred tank reactors, including the Advanced Gas Reactor (AGR) system of the Litz patent, U.S. Pat. No. 4,454,077, have been employed for such mixing operations.

In some instances, however, as in the oxidation of organic liquids, it is necessary to prevent a potentially explosive or flammable vapor-gas phase mixture from developing in the overhead gas phase. For this purpose, oxidation reactions are carried out so as to prevent the oxygen in the gas phase from exceeding the lower flammability limit for a particular operation. In other instances, it may be necessary or desirable to carry out a non-oxidation operation, e.g. hydrogenation, chlorination or other gas-liquid mixing reactions, so as to minimize the loss of gas to the overhead gas phase. For such purposes, a so-called Liquid Organic Reactor (LOR) process and system, as described and claimed in the Litz et al. patent, U.S. Pat. No. 4,900,480, was developed. The LOR process and system enables gases and liquids to be mixed, for dissolving, reacting, or other mixing purposes, without appreciable loss of gas to the overhead gas phase.

The LOR approach, in its most common embodiment, uses a mixing impeller and draft tube arranged to disperse and circulate oxygen bubbles in the liquid phase. When used to safely react gaseous oxygen with flammable liquids, the bubbles comprise a mixture of said oxygen, flammable organic vapor and by-product gases. When the gas is dispersed as small bubbles throughout the liquid phase, the flammability hazard associated with the oxygen and organic gas mixture is mitigated by the heat capacity of the surrounding liquid, which absorbs the heat of reaction in the event of a bubble ignition, and because the flame from a single bubble can not propagate through the liquid phase.

In the LOR system as described in the Litz patent, a recirculating liquid reaction zone is separated from, but remains in fluid communication with, a quiescent zone that is in contact with the overhead gas phase, typically as shown in FIG. 1 of the patent. A baffle between said zones serves to substantially prevent gas bubbles that are carried with the liquid in the recirculating liquid zone from disengaging the liquid because of their buoyancy, thus insuring that the bubbles are recirculated with the liquid and are efficiently consumed by reaction. Any gas bubbles that do escape from the recirculating liquid zone under the baffle, and pass upward through the quiescent zone, are collected in the gas space above the quiescent zone, where they are rendered non-flammable by the addition of inert gas to said gas space.

In laboratory size, e.g. one gallon, LOR systems, a flat baffle is positioned above the draft tube so as to separate the recirculating portion of the body of liquid from the quiescent zone, while maintaining fluid communication therebetween. The baffle serves to direct unreacted gas into the impeller suction, where it is redispersed and recirculated by the mixing impeller, along with the liquid phase. High liquid flow velocity in the upper part of the reactor vessel and the draft tube/impeller suction is implicit because of the small size of the LOR unit, and the large diameter of the draft tube relative to the diameter of the vessel in typical laboratory LOR system embodiments. The high velocity liquid flow serves to drag the gas bubbles into the draft tube faster than buoyant effects cause such gas bubbles to collect on the underside of the baffle or pass into the quiescent zone. In addition, any gas that reaches the underside of the baffle is dragged by the recirculating liquid into the draft tube where it is dispersed upon downward flow therein before it has a chance to form a bubble of dangerous size.

In larger, commercial size LOR systems, however, the typical flat baffle does not function as well to preclude the formation of gas pockets under the baffle as in said laboratory size LOR systems. Regions of low flow velocity, or dead zones, are often found to exist in the upper part of the recirculating liquid zone under the baffle, thereby decreasing the ability of the system to maintain the desired level of gas dispersion. Hence, the ability of the flow of recirculating liquid to prevent gas from collecting in pockets on the underside of the baffle, and the ability of the liquid flow to remove any gas from the underside of the baffle, once it collects thereunder, is appreciably diminished in larger sized LOR systems. Since radial flow velocity decreases with radial distance from the draft tube centered in the reaction vessel, and since absolute distances are a function of scale, the problem of dead zones under the baffle, and the consequent potential for forming hazardous gas pockets, increases with scale when a flat baffle is used to separate the recirculating portion of a body of liquid in an LOR system from the quiescent portion of said body of liquid.

In larger LOR systems, the pumping rate is highest at the impeller tip and lowest near the impeller shaft. Thus, a dead zone is formed near the center of the draft tube in which the impeller is positioned, where the downward liquid flow velocity is not sufficiently high to drag gas downward through the draft tube. As a result, gas tends to collect on the underside of the baffle in the dead zone. This is undesirable because it can lead to the formation of a flammable bubble of dangerous size in the reaction vessel.

It has been proposed to prevent such formation of large flammable gas bubbles under the baffle by simply employing a porous baffle that would enable all gas that would otherwise collect along the underside of the flat baffle to vent into the quiescent zone above the baffle and therefrom into the inert gas space above the baffle. However, such an approach would not be efficient, because the reactant gas, e.g. oxygen, hydrogen, chlorine or the like, which escapes from under the baffle would be wasted and, in the case of oxygen, could cause a flammable or explosive condition in the gas space unless a suitable amount of nitrogen or other inert gas is added thereto.

Under some circumstances, however, particularly when proper gas dispersion in the liquid can not be maintained, the use of such a porous flat baffle may nevertheless be desirable or necessary because accumulated gas must be vented to the inert gas space above the baffle to prevent the formation of a flammable gas pocket in the reaction vessel. This would be the case, for example, under upset conditions when too much oxygen is fed to the reaction vessel, or in the event the impeller drive were to fail, and it is desirable to allow the gas to escape to the inerted overhead gas space because the gas, e.g. oxygen, can not be maintained as a dispersed phase in the body of liquid in the reaction zone.

There is a need in the art, therefore, to provide an LOR system for effectively containing the gas during normal operation thereof, in such a way as to prevent the formation of dangerous gas bubble accumulation and growth in the recirculating liquid zone. Such an LOR system must continue to provide for efficient utilization of feed gas during normal operation, and should allow the gas to be safely vented from the liquid phase in the event that the means for maintaining desired gas dispersion is interrupted or lost.

It is an object of the invention, therefore, to provide an improved LOR system.

It is another object of the invention to provide an LOR system to enhance the dispersion of feed gas in the liquid phase under normal operating conditions so as to enable essentially complete reaction of gas and liquid to occur, and to preclude the formation of any large flammable gas bubbles, or gas pockets, in the reaction vessel.

It is a further object of the invention to provide an LOR system that enables the feed gas to escape to an inerted overhead gas space during upset conditions, when it is not possible to maintain the feed gas as a dispersed phase in the body of liquid in a reaction vessel.

With these and other objects in mind, the invention is hereinafter described in detail, the novel features of the invention being recited in the appended claims.

SUMMARY OF THE INVENTION

An LOR system is operated with sloped inner and outer conical baffles above the draft tube, and a recirculating liquid flow pattern, such as to direct the flow of liquid and dispersed gas into an impeller suction, with minimal collection of gas under the baffle, to eliminate the dead zone near the impeller shaft, and to facilitate the venting of gas to an inert gas space above the quiescent zone during upset conditions, while minimizing the passage of gas to the gas space during normal operating periods.

BRIEF DESCRIPTION OF THE DRAWING

The invention is further described herein with reference to the accompanying drawings, which is a schematic side elevational view of an LOR system representing an embodiment of the invention.

DETAILED DESCRIPTION OF THE INVENTION

The objects of the invention are accomplished by operating an LOR system adapted to (1) maintain a high velocity flow across the diameter of the draft tube in the impeller suction zone, thus eliminating a dead zone in the center of the draft tube; (2) minimize the flow of gas through the gas vent during normal gas-liquid mixing operations therein; (3) enable the flow of a large volume of gas through the gas vent when the recirculating flow of liquid in the reaction vessel is reduced or stopped; and (4) eliminate dead zones in the upper portion of the reaction vessel under the baffle separating the recirculating portion of the body of liquid in the reaction vessel from the quiescence zone. The invention thus addresses practical operational problems encountered in the operation of the highly desirable LOR processes and systems, rendering the LOR technology more convenient and more advantageous for use in a variety of significant industrial gas-liquid mixing operations.

The heart of the invention resides in the use of sloped inner and outer conical baffles that, together with the management of the liquid flow field in the impeller suction, enables such desirable benefits to be achieved. First, the inner conical baffle is constructed in a way such as to maintain a high velocity flow field across the diameter of the draft tube in the impeller suction zone. The slope toward the impeller shaft effectively eliminates the dead zone in the center of the draft tube. Thus, downward liquid flow, with sufficient velocity to drag gas down into the draft tube, is maintained across the diameter of the draft tube. Second, the gas vent is constructed so as to, as indicated above, minimize the gas flow through it during normal operation, i.e. under normal liquid flow conditions, while allowing a large volume of gas to pass through when the liquid flow is reduced or stopped. Finally, the slope of the outer conical baffle precludes the collection of gas underneath it. Gas that hits the underside of said outer baffle is directed into the impeller suction zone under the inner baffle by buoyant effects, thereby eliminating dead zones outside the draft tube.

With reference to the embodiment of the invention illustrated in the drawing, a body of liquid represented by the numeral 1 contained in reactor vessel 2 has a major portion 3 separated from, by baffle means described below, but in fluid communication with, a relatively quiescent portion 4, which has a gas-liquid interface 5 with overhead gas space 6. Said major portion 3 is maintained in a recirculating flow condition by impeller means 7, having drive shaft 8 that extends upward through an inner baffle, described below, for connection with suitable driving means, not shown. Impeller means 7, illustrated as being positioned within hollow draft tube 9, is adapted to provide the indicated vertical flow pattern in which liquid containing dispersed gas passes downward in draft tube 9 and upward in the annular space 10 between draft tube 9 and vertical wall 11 of reactor vessel 2.

In the illustrated embodiment, vertical wall 11 of reactor vessel 2 is shown as extending upward from floor 12 of the vessel to a point at which the wall slopes upward and inward to form outer conical baffle 13. Said outer conical baffle 13 is connected with generally vertical wall 14 of an upper cone shaped portion of the reactor vessel terminating at roof 15 and forming an enclosed space for the relatively quiescent portion 4 of the body of liquid and for overhead gas space 6. Inert gas can be passed to said overhead gas space 6 through line 16 to assure against the creation of flammable conditions in said overhead gas space 6, with gases being vented therefrom through line 17.

Inner conical baffle 18 is positioned above impeller means 7, and above draft tube 9 in the illustrated embodiment, and co-acts with outer conical baffle 13 to enable the desirable benefits referred to above to be achieved in the operation of the LOR system of the invention. Inner conical baffle 18 slopes downward and inward toward impeller shaft 8 from a point near the outer portion of the wall of reactor vessel 2, desirably in the region near the upper end of outer conical baffle 13. Thus, a vent opening 19 is provided in the space between the upper end of inner conical baffle 18 and the upper end of outer conical baffle 13.

In order for a gas bubble to escape from under inner conical baffle 18, it must come in contact with a hole in or around said baffle, i.e. with said vent opening 19. Thus, the amount of gas that escapes is proportional to the probability that a gas bubble will hit a hole. If the gas bubble remains in the liquid flow field, shown by flow pattern A in the lower portion of reactor vessel 2, and by flow pattern B in the upper portion thereof, so that it flows downward into draft tube 9 upon contact with inner conical baffle 18, it can not escape from the recirculating body of liquid and pass into quiescent zone 4 and overhead gas space 6. Thus, the downward slope of inner conical baffle 18 is intended to maximize the flow velocity of liquid under said baffle, minimize the probability that a bubble will come into contact with a hole in or around said baffle, i.e. vent opening 19 under normal operating conditions, and maximize the probability that a bubble will come in contact with a hole, i.e. said vent opening 19, in the event of an upset condition where it is necessary or desirable to vent all or a substantial portion of the gas from under inner conical baffle 18.

Under normal flow conditions, the liquid flow velocity on the underside of inner conical baffle 18 is directed radially inward and downward toward impeller shaft 8 and impeller means 7 and away from vent opening 19. This downward and inward liquid flow drags most gas which contacts the underside of inner conical baffle 18 into the downward impeller suction and away from vent opening 19. When the recirculating flow of liquid is stopped, as when the drive motor for said impeller fails, gas bubbles rise through major portion 3 of body of liquid 1 to the underside of inner conical baffle 18. The slope of said inner baffle directs the gas bubbles to vent opening 19, through which the gas bubbles pass to quiescent portion 4 of the body of liquid and to inerted overhead gas space 6.

It will be understood that various changes and modifications can be made in the details of the invention without departing from the scope of the invention as recited in the appended claims. Thus, outer conical baffle 13 desirably has an inwardly extending flap section 13A, conveniently horizontally, to facilitate the flow of liquid and dispersed gas bubbles away from vent opening 19. Outer conical baffle extension 13A conveniently extends from the upper end of outer conical baffle 13 inward to a position under inner conical baffle 18, preferably at the outer, upper end thereof. As will be seen from the drawing, such a positioning of outer conical baffle extension 13A serves to make vent opening 19 a slit positioned away from the generally inward and downward flow of liquid under said inner conical baffle 18, thereby minimizing the amount of gas venting through vent opening 19 under normal operating conditions in reactor vessel 2.

It will be seen from the drawing that outer conical baffle 13, which is sloped upward and serves to eliminate dead spots outside draft tube 9 since gas cannot collect underneath it, is conveniently the sloping portion of the wall of reactor vessel 2 that extends upward and inward from the top of vertical wall 11 of said reactor vessel 2. It should be noted that, while the illustrated embodiment is convenient and preferred, it is also within the scope of the invention for vertical wall 11 to extend to the upper part of reactor vessel 2, with a separate outer conical baffle 13 being positioned therein to create the desired upward and inward liquid flow path toward inner conical baffle 18 with the flow path of liquid on the underside of inner baffle 18 being downward and inward into the impeller suction above and in draft tube 9. In this regard, it will be appreciated that the upper portion of reactor vessel 2, in which quiescent portion 4 and overhead gas space 6 are contained, need not be smaller diameter than the lower portion of said reactor vessel 2, although the illustrated embodiment is convenient to construct and operate for the subject gas-liquid mixing purposes of the invention.

Attention is called to the downwardly extending portion 18A of inner conical baffle 18. Such portion 18A, generally in the center of reactor vessel 2 above draft tube 9, will be seen to further direct the downwardly and inwardly flowing liquid under said inner conical baffle 18 downward into the suction of impeller means 7 for the desired downward flow of the recirculating portion 3 of the body of liquid through draft tube 9. Drive shaft 8 for impeller means 7 will be seen to extend upward through opening 20 defined by said extension 18A of inner conical baffle 18 for connection to suitable drive means for impeller means 7. Due to the downward flow of liquid above draft tube 9 and impeller means 7, the amount of gas that will escape upward through opening 19 will be negligible during operation of the gas-liquid mixing system.

The feed gas stream is introduced into reaction vessel 2 through conduit means 20 directly into the recirculating portion of the body of liquid, i.e. major portion 3, so that the bubbles of gas formed are maintained essentially in dispersed form in said major portion 3 of the body of liquid. For this purpose, conduit means 20 preferably extend into said major body of liquid in the vicinity of liquid flow pattern B near the top of major portion 3 of the body of liquid for enhanced mixing under the influence of the draft tube-impeller means configuration as enhanced by the inner and outer conical baffles of the invention. It is within the scope of the invention, however, to introduce the feed gas stream to the reactor vessel at any other convenient point, as in liquid flow pattern A near the bottom of reactor vessel, or elsewhere in the recirculating flow of liquid.

It will be noted in the drawing that hollow draft tube 9 contains a conically flared portion 9A at the upper end thereof. This generally preferred, but not essential feature, serves to further facilitate the flow of gas bubble-liquid mixture into said hollow draft tube 9 for downward passage therein. Impeller means 7 positioned within said hollow draft tube 9 are illustrated as a simple impeller blade device adapted to pump liquid down through said draft tube 9 and upward in the annulus between said draft tube 9 and outer wall 11 of reactor vessel 2, and the outer conical baffle 13 portion thereof. Those skilled in the art will appreciate that other impeller means can be employed in the practice of the invention, such as commercially available axial flow helical impeller means for enhancing the desired liquid pumping action and the overall gas-liquid mixing achieved in the practice of the invention. Those skilled in the art will also appreciate that the draft tube-impeller means arrangement can be provided at different locations within reactor vessel 2, i.e. the distance from the bottom of draft tube 9 to floor 12 of reactor vessel 2, so long as the desired recirculating liquid flow pattern is maintained. In various embodiments, flow pattern A in the lower portion of reactor vessel 2 may serve to create rolls cells of enhanced turbulence further facilitating the desired gas-liquid mixing operation.

While downward pumping impeller means are herein described and claimed, it will be appreciated that upward pumping impeller means can also be employed for gas-liquid mixing operations, and baffle arrangements can be devised to accomplish the desirable results achieved using the invention. However, such reverse flow operation is generally less convenient and less suited than the invention as herein described and illustrated.

While the invention has been illustrated by an embodiment employing a desirable and advantageous hollow draft tube-impeller means configuration, it should be noted that the incorporation of a hollow draft tube, while highly preferred, can be omitted in various embodiments provided that the desired recirculating flow condition can be maintained sufficiently without the preferred use of said hollow draft tube.

Those skilled in the art will appreciate that the quiescent portion of the body of liquid can be of any suitable size to provide the desired separation of the recirculating portion of liquid from the overhead gas phase and to accommodate a change in liquid level in response to a change in volume of said body of liquid between the condition in which no gas bubble are in the body of liquid and the condition that exists when a desired gas bubble concentration is developed therein.

The liquid flow velocity into the draft tube section of the system should generally be about 1.5 ft/sec. or more, preferably greater than about 2.0 ft/sec., for the recirculating flow of liquid to carry gas bubbles into the impeller means without significant disengagement of the gas bubbles from the liquid. For a given total flow rate, the desired flow velocity into the draft tube-impeller suction can be adjusted by properly setting the clearance between the draft tube and the inner and outer conical baffles of the invention, i.e. by setting the baffle clearance so that the radial flow velocity across the top of the draft tube toward the center thereof is desirably greater than about 2.0 ft/sec.

For advantageous operation of the invention, the outer diameter of inner conical baffle 18 should generally be from 0.75 to 2.0 times the diameter of the upper entrance to draft tube 9. The slope of said inner conical baffle 18 should generally be from about 5° to about 35°, preferably about 15°, with respect to the horizontal. Outer conical baffle 13 should generally be from about 45° to about 75° with respect to the horizontal, preferably about 60° with respect to the horizontal.

Extension 13A of outer conical baffle 13 will be seen as a flap that overlaps vent opening 19 opening so that there is no uncovered area under inner conical baffle 18 in the recirculating flow path. Said extension 13A and vent opening 19 will be seen to form a vent slit, with a gas bubble having to move against the liquid flow field to pass through the vent slit. The vent opening, and, in the illustrated embodiment, the vent slit, should desirably be located at the highest point of inner conical baffle 18.

Those skilled in the art will appreciate that any baffle configuration that meets the criteria referred to above, i.e. that minimizes the dead zones previously encountered in the practice of the LOR technology and facilitates high liquid flow in the impeller suction zone of the system can be used in the practice of the invention. In general, baffles with smooth contours that more closely follow the streamlines of the liquid flow field in the impeller suction zone that is accomplished by the use of flat baffle surfaces would generally be desirable from a hydrodynamic viewpoint. However, the cost of fabricating such a more complex shape must be weighed against the added benefits thereof.

It will be understood that any desired gas-liquid mixing operation in which the LOR approach is necessary or desirable can be benefited by the practice of the invention. The oxidation of an aliphatic aldehyde is an illustrative example of the type of reaction that can be carried out advantageously using an LOR system containing the desirable baffle arrangement herein described and claimed. The invention also provides a highly desirable improvement in LOR systems for use in other oxygen applications not involving the potential presence of flammable mixtures in the gas phase, and in other valuable hydrogenation, chlorination and other practical gas-liquid mixing operations. By overcoming various practical operating problems encountered in the practice of the highly desirable and advantageous LOR system technology, the invention provides a significant improvement that enhances the ability of the LOR technology to satisfy the need for efficient, effective and economical gas-liquid mixing operations for a wide variety of desirable LOR applications.

I claim:

1. An improved system for the mixing of a gas with a body of liquid without appreciable loss of gas into an overhead gas phase comprising:

(a) a mixing vessel for a body of liquid into which a gas is to be mixed, a portion of said body of liquid to be maintained in a recirculating flow condition, said portion having no gas-liquid interface with an overhead gas phase;

(b) impeller means positioned essentially in the center of the mixing vessel and having an upwardly extending drive shaft, said impeller means being adapted to establish a recirculating flow condition within said recirculating portion of the body of liquid, with liquid flow being downward in the inner region thereof and upward in the outer region thereof;

(c) conduit means for introducing a feed gas stream directly into the recirculating portion of the body of liquid; and (d) baffle means separating said recirculating portion of the body of liquid from a relatively quiescent portion thereof, while maintaining fluid communication therebetween, said quiescent portion of the body of liquid having a gas-liquid interface and an overhead gas phase, and being adapted to accommodate a change in liquid level in response to a change in volume of said body of liquid between the condition in which no gas bubbles are in the body of liquid and the condition that exists when a desired gas bubble concentration is developed therein, said baffle means comprising (a) an outer conical baffle that slopes upward and inward so as to direct the upward flow of liquid, and the accompanying gas, from the outer region of the body of liquid toward the downward suction of the impeller means, the slope of said outer conical baffle precluding the accumulation of gas in dead zones thereunder, and (b) an inner conical baffle that slopes downward and inward toward the drive shaft of said impeller means so as to direct the flow of liquid, and the accompanying gas, into the downward suction of the impeller means, the slope of said inner conical baffle effectively precluding the accumulation of gas in dead zones in the center of said body of liquid, said inner conical baffle being positioned so that its upper, outermost end is above and spaced apart from the uppermost end of the outer conical baffle so as to establish a vent opening therebetween for communication between the recirculating portion of the body of liquid and the quiescent zone, said vent opening being positioned apart from the upward and inward flow path established by said outer conical baffle, whereby the desired gas and liquid mixing are effectively achieved, the inner and outer conical baffles eliminating dead zones near the impeller drive shaft and under the baffle means, minimizing gas velocity during normal operations and facilitating venting of gas during upset conditions.

2. The system of claim 1 and including, at the upper end of the outer conical baffle, an inwardly extending flap section overlapping said vent opening so as to deflect any upwardly moving liquid away from the vent opening toward the inner conical baffle, said flat section and said vent opening forming a vent slit positioned opposite the direction of the liquid flow towards said inner conical baffle.

3. The system of claim 1 in which said impeller means comprises down pumping axial flow impeller means.

4. The system of claim 1 and including a downwardly extending portion of said inner conical baffle, said downwardly extending portion facilitating the downward flow of liquid from under the inner conical baffle to the suction of the impeller means.

5. The system of claim 1 in which the slope of the outer conical baffle is from about 45° to about 75° with respect to the horizontal.

6. The system of claim 5 in which said slope of the outer conical baffle is about 60° with respect to the horizontal.

7. The system of claim 1 in which the slope of said inner conical baffle is from about 5° to about 35° with respect to the horizontal.

8. The system of claim 7 in which said slope is about 15° with respect to the horizontal.

9. The system of claim 1 and including a hollow draft tube positioned essentially centrally within the mixing vessel in the region of the portion of the body of liquid maintained in a liquid flow condition, with open ends at the top and bottom thereof, the impeller means being positioned therein.

10. The system of claim 9 in which the outer diameter of said inner conical baffle is from about 0.75 to 2.0 times the diameter of the hollow draft tube at the upper end thereof.

11. The system of claim 10 in which said outer diameter of said inner conical baffle is from about 1.0 to 1.2 times the diameter of the hollow draft tube at the upper end thereof.

12. The system of claim 9 in which the clearance between said hollow draft tube and said baffle means is such that the radial flow velocity of liquid passing to the suction of the impeller means is greater than about 1.5 ft/sec.

13. The system of claim 12 in which said clearance is such that said radial flow velocity is greater than about 2.0 ft/sec.

14. The system of claim 9 and including, at the upper end of the outer conical baffle, an inwardly extending flap system overlapping said vent opening so as to deflect any upward moving liquid away from the vent opening toward the inner conical baffle, said inner conical baffle including a downwardly extending portion facilitating the downward flow of liquid, and accompanying gas, from under the inner conical baffle to the suction of the impeller means, the outer diameter of said inner conical baffle being from about 0.75 to about 2.0 times the diameter of the hollow draft tube at the upper end thereof, the slope of the inner conical baffle being from about 5° to about 35° with respect to the horizontal, the slope of the outer conical baffle being from about 45° to about 75° with respect to the horizontal.

15. The system of claim 14 in which the outer diameter of the inner conical baffle is from abut 1.0 to 1.2 times the diameter of the hollow draft tube at the upper end thereof, the slope of the inner conical baffle is about 15° with respect to the horizontal, and the slope of the outer conical baffle is about 60° with respect to the horizontal.

* * * * *